United States Patent Office 3,525,632
Patented Aug. 25, 1970

3,525,632
METHOD FOR FORMING A CONCRETE
CEMENT COMPOSITION
Charles R. Enoch, King of Prussia, Pa., assignor to Resco Products, Inc., Norristown, Pa., a corporation of Pennsylvania
No Drawing. Continuation-in-part of application Ser. No. 474,943, July 26, 1965. This application Nov. 8, 1967, Ser. No. 681,577
Int. Cl. C04b 7/32, 9/04, 9/18
U.S. Cl. 106—85     1 Claim

ABSTRACT OF THE DISCLOSURE

A method for forming a rapid setting concrete cement composition which comprises dry blending magnesium containing compounds, aluminum containing compounds, and phosphorous containing compounds from stated sources and in stated weight percentage, and then pulverizing the blended material without a separate drying stage.

---

The present invention is directed to a method for forming a concrete cement composition, and more particularly to a concrete cement composition which is non-hygroscopic. In particular, the present invention is directed to a method for forming an improved concrete cement composition comprising phosphoric acid, and aluminum and magnesium factors.

The present invention constitutes a continuation-in-part application of my application Ser. No. 474,943 filed July 26, 1965 and now abandoned, entitled: Concrete Cement Composition.

In my Pat. No. 3,202,520 issued Aug. 24, 1965, I disclosed a concrete cement composition suitable for preparing rapid setting concrete when blended with aggregates. This composition sets within about two hours to yield a non-hygroscopic cast concrete. The concrete cement composition of my Pat. No. 3,202,520 consists essentially of phosphoric acid, used in its liquid state, alumina and magnesium oxide. The compositions of my Pat. No. 3,202,520 are non-hygroscopic, and set within about two hours. Moreover, they may be applied through a pneumatic gun or pneumatic ram or the like. Generally, they are prepared by dry blending finely powdered magnesium oxide into a finely powdered mixture of liquid phosphoric acid and alumina which had previously been blended together by having the alumina added to the liquid phosphoric acid, followed by drying at a sufficient temperature and for a sufficient period of time to remove all moisture, and with subsequent pulverization of the dried material.

While the concrete cement compositions of my Pat. No. 3,202,520 are superior, I have found that the necessity for drying to remove moisture resulted in an increased cost with these concrete cement compositions. Thus, this drying step should be done in stainless steel equipment in order to avoid corrosion and contamination problems. Such equipment is expensive. Moreover, during drying, there is a pronounced tendency for the mixture to cake within the drier, which gives rise to a production problem.

This invention has as an object the provision of a method of forming a quick drying, non-hygroscopic concrete cement composition which has excellent shelf life which does not require a drying stage in its manufacture.

Other objects will appear hereinafter.

These and other objects are accomplished by the method of the present invention in which a rapid setting concrete cement composition which can contain up to about 15 weight percent of combined and uncombined water is prepared by dry blending together magnesium containing compounds, aluminum containing compounds, and phosphorous containing compounds. The magnesium factor is derived from the magnesium containing compounds and when calculated as MgO comprises from about 7 to about 15 weight percent of the composition, with the magnesium containing compounds being selected from the group consisting of magnesium oxide, and mixtures of magnesium oxide and trimagnesium phosphate. The aluminum factor is derived from the aluminum containing compounds and when calculated as $Al_2O_3$ comprises from about 45 to about 75 weight percent of the composition, with at least about 80 weight percent of the aluminum factor being derived from alumina. The phosphorous factor is derived from the phosphorous containing compounds, and when calculated as $P_2O_5$ comprises from about 15 to about 40 weight percent of the composition, with the phosphorous factor being derived from not more than about 50 weight percent of a phosphoric acid of 85 weight percent concentration and at least 50 weight percent of a compound selected from the group consisting of aluminum orthophosphate, trimagnesium phosphate, phosphoric anhydride and mixtures thereof. Thus, in the method of the present invention, the components are dry blended together at room temperature, without a separate drying stage. Preferably, the blended material should be pulverized such as to 325 mesh.

The chemical nature of the phosphoric acid is not essential. Thus, I have successfully used both orthophosphoric and polyphosphoric acid in the compositions of the present invention. However, the phosphoric acid should not have more than 15 weight percent of moisture present, namely its concentration should be at least 85 weight percent. In addition, the total amount of the phosphoric acid present in the composition should be no greater than that required to supply 50 weight percent of the $P_2O_5$ of the composition, and preferably less.

The $P_2O_5$ is derived from the phosphoric acid, and one or more of the following, at least one of which should be present in the mixture: trimagnesium phosphate, aluminum orthophosphate, and phosphoric anhydride. At least 50 weight percent of the phosphorous factor should be supplied from the trimagnesium phosphate, aluminum orthophosphate, and phosphoric anhydride.

The alumina is derived from the alumina and also from the aluminum orthophosphate, if the latter is present in the composition with the alumina.

The magnesium oxide is derived from the magnesium oxide, and from trimagnesium phosphate, if the latter is present in the composition with the magnesia.

Water may be present in the composition, although the same is not necessary, up to about 15 parts by weight. The water is derived from water present in the phosphoric acid, or water of hydration from the salts used to make the composition.

The components should be powdered to the extent that the same is possible, as finely as possible. Thus, if it is at all possible, the components should be so finely divided as to pass through a 325 mesh screen.

The concrete cement compositions of the present invention may be dry blended to form concrete with a wide variety of aggregates. For example, castable concrete may be formed by the addition of crushed silicon carbide, silica, chromium oxide, calcined clays, tabular alumina, or mixtures of the foregoing. The concentration of these aggregates in the concrete will vary depending upon the quantities sought in the finished concrete. While the present invention is directed to the concrete cement composition, rather than to the concrete, generally the concrete cement compositions of the present invention may form from 20 to 30 weight percent of the concrete, with the aforesaid or similar aggregates forming the remainder. At the time of the usage of the concrete, the user will add water, as in the amount of from 3 to 8 weight percent, and then cast the concrete blend. The cast concrete blend will be non-hygroscopic, and will set rapidly. While the setting time will vary depending upon the ambient temperature conditions, it will generally be less than about two hours. Concrete, of the aforesaid type, may be applied by a trowel, and also by a pneumatic gun or pneumatic ram.

The compositions of the subject method are prepared by blending the components together in their powder state at room temperature. As heretofore indicated, it is not necessary to dry at any stage in order to remove moisture. However, the blending should be thorough.

I have found that the shelf life of the concrete cement compositions prepared by the subject method is excellent.

By way of illustration, there is set forth below examples of the concrete cement compositions made by the method of the present invention. These examples are by way of illustration, and can be varied in accordance with the disclosure set forth above. In each instance, the concrete cement composition was prepared by dry blending the components at room temperature in the absence of drying. Pulverization of the blended material is desirable, as to 325 mesh.

CHART NO. 1.—EXAMPLE COMPOSITIONS IN WEIGHT PERCENT

|  | 1 | 2 | 3 | 4 | 5 | 6 | 7 | 8 |
|---|---|---|---|---|---|---|---|---|
| MgO | 9 | 9 | 10 | 10 | 6 | 6 | 10 | 10 |
| Trimagnesium Phosphate | | | | 12 | 25 | | 10 | |
| Alumina | 52 | 58 | 63 | 57 | 45 | 74 | 50 | 63 |
| Aluminum phosphate | | 10 | 20 | | | | 15 | 10 |
| 85% phosphoric acid | 15 | | 10 | 15 | | | 10 | 5 |
| Polyphosphoric acid | 14 | 15 | | | 15 | 12 | 5 | |
| Phosphoric anhydride | 10 | 8 | | 6 | | 8 | | 12 |

CHART NO. 2.—RESULT WHEN COMPOSITIONS IN CHART NO. 1 ARE ANALYZED CHEMICALLY

|  | 1 | 2 | 3 | 4 | 5 | 6 | 7 | 8 |
|---|---|---|---|---|---|---|---|---|
| $Al_2O_3$ | 52 | 60 | 63 | 57 | 54 | 74 | 50 | 63 |
| $P_2O_5$ | 33 | 31 | 23 | 19 | 24 | 15 | 24 | 23 |
| MgO | 9 | 9 | 7 | 14 | 14 | 15 | 13 | 10 |

It is to be noted that the quantitative chemical analysis set forth in Chart #2 do not add up to 100 weight percent. The reason for this is that in addition to the aluminum oxide, phosphoric anhydride, and magnesium oxide found in the analysis, water was also present.

It is to be observed that the concrete cement compositions of the present invention may include inert extenders, particularly in those compositions where the aluminum weight percentages is low. The inert extender may be commingled with the aluminum orthophosphate, as by dry blending. The inert extender, which may be silica, should not react with the phosphoric acid.

The present invention may be embodied in other specific forms without departing from the spirit or essential attributes thereof and, accordingly, reference should be made to the appended claim, rather than to the foregoing specification as indicating the scope of the invention.

It is claimed:
1. The method of forming a quick drying, non-hygroscopic concrete cement which has an excellent shelf life which comprises:
 (I) Dry blending together magnesium containing compounds, aluminum containing compounds and phosphorous containing compounds;
  (a) the magnesium factor in the concrete cement being derived from the magnesium containing compounds and when calculated as MgO comprising from about 7 to about 15 weight percent of the concrete cement, with the magnesium containing compounds being selected from the group consisting of magnesium oxide, and mixtures of magnesium oxide and trimagnesium phosphate;
  (b) the aluminum factor in the concrete cement being derived from the aluminum containing compounds and when calculated as $Al_2O_3$ comprising from about 45 to about 75 weight percent of the concrete cement composition, with at least about 80 weight percent of the aluminum factor being derived from alumina and the remainder being derived from aluminum phosphate;
  (c) the phosphorous factor being derived from the phosphorous containing compounds and when calculated as $P_2O_5$ comprising from about 15 to about 40 weight percent of the cement composition, and with not more than about 50 weight percent, of the phosphorous factor being derived from a phosphoric acid of 85 weight percent concentration and at least 50 weight percent from a compound selected from the group consisting of aluminum orthophosphate, trimagnesium phosphate, phosphoric anhydride, and mixtures thereof;
  (d) the total amount of water being present during the dry blending being below about 15 weight percent, and
 (II) Pulverizing the dry blended material without an intermediate drying step.

References Cited

UNITED STATES PATENTS

| | | |
|---|---|---|
| 3,202,520 | 8/1965 | Enoch. |
| 2,450,952 | 10/1948 | Greger. |
| 2,405,884 | 8/1946 | Greger. |
| 2,391,493 | 12/1945 | Wainer et el. |
| 2,324,079 | 7/1943 | Greger. |

TOBIAS E. LEVOW, Primary Examiner

W. T. SCOTT, Assistant Examiner

U.S. Cl. X.R.

106—104, 105, 106, 121